United States Patent
Kiss et al.

(10) Patent No.: US 10,383,016 B2
(45) Date of Patent: Aug. 13, 2019

(54) METHODS AND APPARATUS TO SUPPORT EMERGENCY SERVICES CONNECTIVITY REQUESTS THROUGH UNTRUSTED WIRELESS NETWORKS

(71) Applicant: Apple Inc., Cupertino, CA (US)

(72) Inventors: Krisztian Kiss, Hayward, CA (US); Rohan C. Malthankar, San Jose, CA (US); Vikram Bhaskara Yerrabommanahalli, Sunnyvale, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 15/198,396

(22) Filed: Jun. 30, 2016

(65) Prior Publication Data
US 2017/0006514 A1 Jan. 5, 2017

Related U.S. Application Data
(60) Provisional application No. 62/188,442, filed on Jul. 2, 2015.

(51) Int. Cl.
*H04W 36/14* (2009.01)
*H04J 11/00* (2006.01)
(Continued)

(52) U.S. Cl.
CPC .............. *H04W 36/14* (2013.01); *H04J 11/00* (2013.01); *H04L 45/745* (2013.01); *H04W 4/90* (2018.02);
(Continued)

(58) Field of Classification Search
None
See application file for complete search history.

(56) References Cited

U.S. PATENT DOCUMENTS 8,867,411 B2 * 10/2014 Ionescu ................... H04W 4/90
370/259
9,072,075 B2 * 6/2015 Tiwari ............... H04W 76/007
(Continued)

FOREIGN PATENT DOCUMENTS

| CN | 101222676 A | 7/2008 |
| CN | 101352058 A | 1/2009 |

(Continued)

OTHER PUBLICATIONS

European Patent Application No. 16177407.0—Extended European Search Report dated Nov. 4, 2016.
(Continued)

*Primary Examiner* — Donald L Mills
(74) *Attorney, Agent, or Firm* — Dickinson Wright RLLP (57) ABSTRACT

Apparatus and methods to support emergency services through untrusted wireless networks by a user equipment (UE) are disclosed. The UE detects a request for emergency services to be provided via an untrusted wireless network. The UE de-registers from any non-emergency services and releases any existing PDN connections. The UE sends a request for emergency services to an evolved packet data gateway (ePDG) at an Internet Protocol (IP) address obtained from a table or from a domain name system (DNS) server. The request includes an indication for emergency services using a configuration attribute assigned to indicate emergency services. The UE receives from the ePDG an indication of support for emergency services in a reply to the request.

19 Claims, 6 Drawing Sheets

(51) Int. Cl.
*H04L 12/741* (2013.01)
*H04W 60/06* (2009.01)
*H04W 76/50* (2018.01)
*H04W 4/90* (2018.01)
*H04W 76/34* (2018.01)
*H04W 84/12* (2009.01)
*H04W 88/06* (2009.01)
*H04W 88/16* (2009.01)
*H04W 76/32* (2018.01)
*H04W 76/12* (2018.01)

(52) U.S. Cl.
CPC ........... H04W 60/06 (2013.01); H04W 76/34 (2018.02); H04W 76/50 (2018.02); *H04M 2207/187* (2013.01); *H04W 76/12* (2018.02); *H04W 76/32* (2018.02); *H04W 84/12* (2013.01); *H04W 88/06* (2013.01); *H04W 88/16* (2013.01)

(56) References Cited

U.S. PATENT DOCUMENTS 9,125,119 B2* 9/2015 Jang ................... H04W 36/14
9,313,636 B2* 4/2016 Tiwari .................. H04W 4/22
2008/0214240 A1 9/2008 Choi et al.
2010/0142499 A1* 6/2010 Zhang ................... H04L 63/08
370/338
2011/0188411 A1* 8/2011 Faccin .................. H04W 76/10
370/259
2016/0295386 A1* 10/2016 Faccin ............... H04L 63/0485

FOREIGN PATENT DOCUMENTS

CN 101365178 A 2/2009
WO 2011097173 A1 8/2011

OTHER PUBLICATIONS

3GPP TS 23.003 V13.2.0 "3rd Generation Partnership Project; Technical Specification Group Core Network and Terminals; Numbering, addressing and identification (Release 13)", pp. 1-93 (Jun. 17, 2015).
3GPP TR 23.771 V1.0.0, "3rd Generation Partnership Project; Technical Specification Group Services and System Aspects; Study on system impacts of IMS emergency sessions over WLAN (Release 13)", pp. 1-21 (Jun. 10, 2015).
Chinese Application for Invention No. 201610730194.X—First Office Action dated Mar. 15, 2019.

* cited by examiner

METHODS AND APPARATUS TO SUPPORT EMERGENCY SERVICES CONNECTIVITY REQUESTS THROUGH UNTRUSTED WIRELESS NETWORKS

CROSS-REFERENCE TO RELATED APPLICATIONS

This application claims the benefit of U.S. Provisional Application No. 62/188,442, entitled "METHODS AND APPARATUS TO SUPPORT EMERGENCY SERVICES CONNECTIVITY REQUESTS THROUGH UNTRUSTED WIRELESS NETWORKS", filed Jul. 2, 2015, the content of which is incorporated by reference herein in its entirety for all purposes.

FIELD

The described embodiments relate to wireless communications, including to supporting emergency services connectivity requests to access cellular core networks and to establishing prioritized connections with network gateways through untrusted wireless networks by a wireless communication device.

BACKGROUND

Fourth generation (4G) cellular wireless networks employing newer radio access technology that implements one or more 3rd Generation Partnership Project (3GPP) Long Term Evolution (LTE) and LTE Advanced (LTE-A) standards are rapidly being developed and deployed by network operators worldwide. The newer cellular wireless networks provide a range of packet-based services in parallel with legacy second generation (2G) and third generation (3G) wireless networks that can provide both circuit-switched voice services and packet-switched data services. The cellular wireless networks also overlap with multiple wireless local area network (WLAN) based networks that can provide additional localized high-speed packet data access for various services. Wireless communication devices can include capabilities to connect with different types of wireless networks, e.g., based on what wireless networks are available at a particular location, based on various capabilities of available wireless networks, based on capabilities of the wireless communication device, based on properties of particular services provided by one or more of the wireless networks, and/or based on service subscriptions with which the wireless communication device is associated. Wireless communication devices can include wireless radio circuitry that provides for communication via multiple radio frequency interfaces that can connect through different wireless networks. Wireless cellular network service providers are adding WLAN connectivity to provide access to cellular services through WLAN networks to provide access for cellular service subscribers that supplement access via cellular wireless networks. In some circumstances, access to particular cellular services by a subscriber using a wireless communication device may vary based on whether the wireless communication device is connected through an access network portion of a cellular wireless network, through a trusted non-cellular wireless local area network, or through an untrusted non-cellular wireless local area network. In addition to accessing normal services via a cellular wireless network and/or via a non-cellular wireless network, a wireless communication device can also provide access to emergency services, such as for access to police, firefighting, and/or medical emergency services. As access via a cellular wireless network may be unavailable, depending on a location of the wireless communication device and/or availability of various types of wireless networks, there exists a need for solutions that provide for managing access to emergency services by a wireless communication device when connecting through untrusted wireless networks.

SUMMARY

Apparatus and methods to support access to emergency services through untrusted wireless networks by a wireless communication device, such as a user equipment (UE), are disclosed. Representative embodiments of methods and apparatuses for a wireless communication device to request establishment of a connection for emergency services via an untrusted wireless network are provided herein. Solutions provided herein may be used as part of and/or in conjunction with one or more 3GPP wireless communication protocols.

A UE detects a request for emergency services, which can be provided via an untrusted wireless network, such as an untrusted wireless local area network (WLAN). In response to detecting the request for emergency services, the UE can perform actions depending upon whether the UE is already connected via the untrusted WLAN. When the UE is connected via the untrusted WLAN, the UE can de-register from an IP Multimedia Subsystem (IMS) server for any non-emergency services and can release any existing PDN connections via the untrusted WLAN before establishing a new connection for emergency services, e.g., establishing a connection specifically dedicated to emergency services. When the UE is not connected by any PDN connections via the untrusted WLAN, the UE can send a request to establish a connection, e.g., a dedicated connection, for emergency services to a network element, such as to an evolved packet data gateway (ePDG). The UE can obtain an Internet Protocol (IP) address for the ePDG, to which to send the request, by using a statically configured table, which can include IP addresses for applicable ePDG servers, or by receiving an IP address from a domain name system (DNS) server in response to providing a fully qualified domain name (FQDN) to the DNS server, where the FQDN includes an appended label that indicates to the DNS server that the ePDG should support emergency services, which can include via an untrusted wireless network, such as via the untrusted WLAN. The UE sends to the ePDG a request to establish a connection for emergency services at least by including an indication for emergency services in the request, e.g., by using a configuration attribute assigned to indicate emergency services. The UE receives from the ePDG, when the ePDG supports emergency services connections via the untrusted WLAN, an indication of support for emergency services via untrusted wireless networks in a reply to the request for establishing the connection. The reply sent to the UE by the ePDG can include the same configuration attribute assigned to indicate emergency services as sent by the UE to the ePDG to indicate to the UE support for emergency services as requested. When the emergency services connection is established (and/or as part of establishment of the emergency services connection), the UE can register with the IMS server for emergency services via the untrusted WLAN.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Representative examples for establishing a connection to access emergency services of an evolved packet core (EPC) of a wireless network via an untrusted wireless local area network (WLAN) by a wireless communication device are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

Wireless service providers are deploying WLANs in parallel with cellular wireless networks to expand options for access to evolved packet core (EPC) services, such as Internet Protocol Multimedia Subsystem (IMS) based services including voice over IP (VOIP), Application type services including visual voice mail (VVM), short message service (SMS), and multimedia message service (MMS), and emergency services, such as access to police, firefighting, and medical services. Access to these EPC services through an untrusted WLAN can be realized using an S2b reference point interface. Wireless communication devices can support packet data network (PDN) connections through multiple wireless interfaces, such as via a cellular wireless interface and via a WLAN interface, both individually and in parallel. Access to emergency services can be provided via a cellular wireless network and/or via an untrusted WLAN. An emergency services PDN connection can require a higher (or highest) level of priority for quality of service (QoS) to ensure that the emergency service PDN connection is not hindered by network congestion. When requesting to establish an emergency services connection, the wireless communication device can be in an unconnected state with any wireless access network, can be connected via a cellular wireless access network, can be connected via an untrusted WLAN, or can be connected both via a cellular wireless access network and via an untrusted WLAN. In some embodiments, when access via a cellular wireless access network is available, a request for emergency services can preferentially be sent via the cellular wireless access network. In some embodiments, when access via a cellular wireless access network is not available and access via an untrusted WLAN is available, the request for emergency services can be sent via the untrusted WLAN. In some embodiments, the request for emergency services can include an indication for emergency services as part of a request to establish a PDN connection. One or more network elements that can support establishment of the PDN connection for emergency services can respond to the request by providing an indication of support for emergency services in response to the request. In some embodiments, the indication of support for emergency services can indicate that connections via an untrusted wireless network, e.g., via an untrusted WLAN, is supported by the one or more network elements. In some embodiments, one or more existing PDN connections between the wireless communication device and the EPC of a wireless network via an untrusted WLAN can be released by the wireless communication device when the request for emergency services is detected by the wireless communication device. The wireless communication device can also de-register from an IMS server associated with the EPC for any existing non-emergency services with which the wireless communication device is registered via the untrusted WLAN. The wireless communication device can select an evolved packet data gateway (ePDG) that supports emergency services and establish a new PDN connection for emergency services with the selected ePDG. The wireless communication device can register with an IMS server for emergency services to be provided via the new PDN connection. In some embodiments, the PDN connection for emergency services can be associated with a higher QoS level or a highest QoS level to ensure priority for packets communicated via the PDN connection for emergency services. In some embodiments, the wireless communication device indicates the request for emergency services using a configuration attribute field as part of a configuration payload sent during establishment of the PDN connection. In some embodiments, the wireless communication device includes the configuration attribute field in an IKEv2 signaling message, such as part of a CFG_REQUEST configuration payload in an IKE_AUTH request, sent to the ePDG. When the ePDG can support establishment of an emergency services PDN connection, the ePDG can reply by including the configuration attribute field (or an equivalent field that indicates support for emergency services) in an IKEv2 signaling message sent to the wireless communication device, such as in a CFG_REPLY configuration payload of an IKE_AUTH reply. In some embodiments, the ePDG also informs other network elements, such as an authentication, authorization, and accounting (AAA) server, which can be connected to a home subscriber server (HSS), of the emergency services PDN connection established with the wireless communication device. The other network elements can use the indication of the establishment of the emergency services PDN connection provided directly from the ePDG (or indirectly via other network elements) to configure hardware, software, or a combination thereof to prioritize packet delivery and control plane settings for the emergency services PDN connection. An Internet Protocol Security (IPSec) tunnel that is established between the wireless communication device and the ePDG that supports the emergency services connection, as a result of the request for emergency services, can be dedicated for emergency services use.

As described herein, in some embodiments, the wireless communication device indicates a request for an emergency services connection to an ePDG using an extension to an IKEv2 signaling message, e.g., in a CFG_REQUEST configuration payload, and receives a reply that indicates support for the emergency services connection from the ePDG using a similar extension to an IKEv2 signaling message, e.g., in a CFG_REPLY configuration payload. In some embodiments, the use of an IKEv2 extension can be required, to provide at least in part for establishing an emergency services connection without the use of authentication, such as when the wireless communication device cannot authenticate with a cellular wireless network or with an access point of an untrusted WLAN. Providing the capability to make an emergency services connection irrespective of the capability of the wireless communication device to provide authentication (and/or authorization) can ensure that such a connection can always be made, at least when a usable wireless access network is reachable from the wireless communication device. Without requiring authentication, a wireless communication device that has no installed Subscriber Identity Module (SIM) card (or no installed or usable electronic SIM on an embedded Universal Integrated Circuit Card (eUICC)) that can be used for authentication can still provide at least an emergency services connection via an untrusted WLAN, when an access point for the untrusted WLAN is available and reachable from the wireless communication device.

Different ePDGs of wireless networks can provide different capabilities, and as such, some ePDGs can support emergency services connections while other ePDGs can be unable to support emergency services connections. The wireless communication device, in response to detecting an emergency services connection request, such as from a user of the wireless communication device via a user interface, can select an ePDG with which to establish a PDN connection for the emergency services connection. In some embodiments, the wireless communication device maintains (locally or via another access) a database containing information including a set of Fully Qualified Domain Names (FQDNs) or IP addresses for ePDGs that support emergency services connections. The wireless communication device obtains an IP address or an FQDN for the ePDG with which to establish the PDN connection for emergency services. In some embodiments, the database is stored in and/or associated with the wireless communication device. In some embodiments, the database is stored (in whole or in part) in a network element accessible by the wireless communication device. In some embodiments, each wireless network maintains a database of IP addresses and/or FQDNs for ePDGs with which emergency services can be provided. In some embodiments, the wireless communication device maintains and/or accesses a database of IP addresses or FQDNs for a Home Public Land Mobile Network (HPLMN) with which a user of the wireless communication device has a subscription for a service with the HPLMN. In some embodiments, the wireless communication device obtains an IP address for an ePDG that supports emergency services communication by querying a network element, e.g., by sending an FQDN to the network element to obtain the ePDG address and indicating to the network element in the FQDN that the ePDG must support emergency services. By using a dynamic selection of an ePDG (rather than a static stored database of ePDGs) the wireless communication device can obtain an up-to-date ePDG IP address. The dynamic selection of the ePDG address can be used when operating in an HPLMN and/or when operating in a Visited PLMN (VPLMN). In some embodiments, the wireless communication device appends an indication of the requirement for emergency services as part of the FQDN, e.g., by prepending, inserting, or appending an "sos" label indication or other comparable emergency services label indication in the FQDN. For an ePDG that supports emergency services, an IP address returned from a query using an FQDN that includes the sos label indication (or other comparable emergency services label indication) will be the same as an IP address returned from a query using an FQDN that does not include the sos label indication.

In some embodiments, redirection from an ePDG that does not support emergency services to an ePDG that does support emergency services can be used, e.g., using redirection as specified in the Request For Comments (RFC) 5685 document published by the Internet Engineering Task Force (IETF) and incorporated by reference herein for all purposes. The wireless communication device can send a request that includes an indication for emergency services to a first ePDG, e.g., using an IP address returned from a DNS server query based on an FQDN that does not include the "sos" label indication (or other equivalent emergency services label indication). When the first ePDG supports emergency services, the PDN connection dedicated to emergency services can be established with the first ePDG. When the first ePDG does not support emergency services, the first ePDG responds by redirecting the wireless communication device to a second ePDG that does support emergency services, e.g., by providing an IP address for the second ePDG to the wireless communication device, which can then send another request for establishing an emergency services connection to the second ePDG that supports emergency services.

In some embodiments, a wireless communication device can be connected to only a single ePDG at one time. When the wireless communication device is already connected to an ePDG for non-emergency services, whether the ePDG can support emergency services or not, the wireless communication device can disconnect from the ePDG in response to detection of an emergency services connection request. The wireless communication device can subsequently establish a new connection dedicated to emergency services to an ePDG (which in some circumstances can be the same ePDG to which the wireless communication device was previously connected). In some embodiments, the wireless communication device communicates through a local access point (AP) of a WLAN to an ePDG to request an emergency services connection without having to authenticate (or otherwise establish an authenticated and/or authorized connection with the AP). In some embodiments, the wireless communication device can connect to more than one ePDG at a time, and an existing non-emergency services connection to a first ePDG can remain in place while a second emergency services connection is established to either the first ePDG, e.g., when the first ePDG supports emergency services connections, or to a second ePDG that supports emergency services connections in parallel with the non-emergency services connection to the first ePDG, which may not support emergency services connections.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) LTE and LTE Advanced (LTE-A) or similar later generation cellular wireless access communication capabilities as well as wireless local area network communication capabilities. In various embodiments, these capabilities may allow a respective UE to communicate and manage simultaneous IP flows via multiple wireless access networks, e.g., including a connection via a cellular wireless access network in parallel with a connection via a non-cellular wireless access network, such as via a WLAN.

Additionally, it should be understood that the UEs described herein may be configured as multi-mode wireless communication devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, and LTE-A standards or 3GPP2's CDMA2000 (1×RTT, 2×EV-DO, HRPD, eHRPD) standards. Multi-mode UEs can also support communication using wireless local area networking protocols, e.g., IEEE 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

IKEv2 is an Internet Engineering Task Force (IETF) specified protocol described in the Request For Comments (RFC) 5996 and RFC 7296 documents, which are incorporated by reference herein in their entirety for all purposes. The IKEv2 signaling protocol can be used to establish a security association between the UE and a network element, e.g., an evolved packet data gateway (ePDG), such as when establishing an Internet Protocol Security (IPsec) Encapsulated Security Protocol (ESP) tunnel between the UE and the network element to provide for secure communication between the UE and the network, such as based on mutual authentication and cryptographic key negotiation. The IKEv2 signaling protocol can also be used to exchange additional information between the UE and the ePDG using an extensibility mechanism, e.g., using information messages and information exchange sequences as defined, at least in part, in Sections 1.4 and 1.5 of RFC 5996. Support for IMS emergency services via an untrusted WLAN can be specified at least in part in a 3GPP wireless communication protocol, such as under development in the 3GPP Technical Recommendation (TR) 23.771. In some embodiments, the wireless communication device follows procedures to select a network element, such as an ePDG, that supports emergency services via an untrusted WLAN as described in 3GPP Technical Specification (TS) 23.402 and/or TS 23.003, each of which is incorporated by reference herein for all purposes. In some embodiments, one or more network elements, such as an ePDG that does not support emergency services via an untrusted WLAN, redirects the wireless communication device to another ePDG that does support emergency services, such as by using redirection procedures described in the RFC 5685 document, which is incorporated by reference herein for all purposes.

Figure 1:
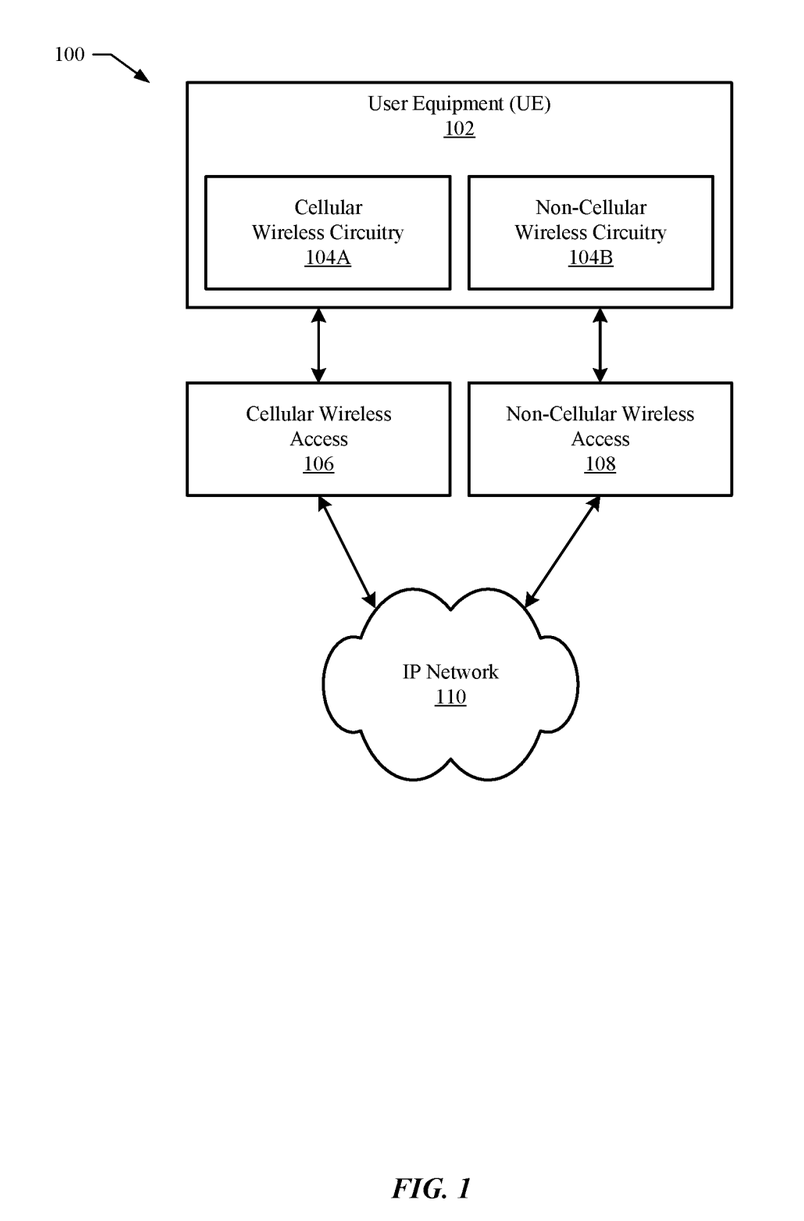
FIG. 1 illustrates an example wireless communication device configurable to connect individually or in parallel through a cellular wireless access network and a non-cellular wireless access network, in accordance with some embodiments.

FIG. 1 illustrates an example wireless system 100 that includes an example wireless communication device, e.g., a user equipment (UE) 102, which includes wireless circuitry that can be configured to connect the UE 102 with one or more wireless networks individually or in parallel. The UE 102 includes both cellular wireless circuitry 104A, which can be configured to connect the UE 102 through a cellular wireless access 106 to various services provided via an Internet Protocol (IP) packet based network 110, and non-cellular wireless circuitry 104B, which can be configured to connect the UE 102 through a non-cellular wireless access 108 to the same IP network 110. An LTE evolved packet system (EPS) provides services to the UE 102, both real-time services, such as voice/video conference calls, and data communication services, such as web browsing and email access, using an IP protocol. The LTE EPS, as introduced in the Release 8 3GPP wireless communication standard, defines an architecture in which heterogeneous wireless access systems, such as a combination of cellular wireless access 106 and non-cellular wireless access 108, can be used by the UE 102 to connect to a common core network (not shown). The UE 102 can establish a packet data network (PDN) connection through a first wireless access and subsequently add or change to a second wireless access. The UE 102 can communicate over multiple wireless access paths, such as via the cellular wireless access 106 and via the non-cellular wireless access 108, individually or simultaneously using the same PDN connection. In some circumstances, a wireless service provider can allow access to emergency services through a first type of wireless access, e.g., via the cellular wireless access 106 and through a second type of wireless access, e.g., via the non-cellular wireless access 108. Thus, when supported by the wireless service provider, the UE 102 can access emergency services through an untrusted WLAN via an S2b interface IPSec tunnel.

The cellular wireless circuitry 104A and the non-cellular wireless circuitry 104B provide for wireless radio frequency (RF) connections between the UE 102 and parallel wireless networks that interconnect with the IP network 110 via the cellular wireless access 106 and the non-cellular wireless access 108 respectively. In some embodiments, the wireless circuitry 104A/B includes one or more baseband processor(s) and RF analog front-end circuitry. In some embodiments, the wireless circuitry 104A/B and/or a portion thereof can include or be referred to as one or more wireless transmitter(s)/receiver(s) or transceiver(s) or radio(s). The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 104A/B can include components of RF analog front-end circuitry, e.g. a set of one or more antennas, which can be interconnected with additional supporting RF circuitry that can include filters and other analog components that can be configured for transmission and/or reception of analog signals via one or more corresponding antennas to one or more wireless access networks and/or wireless access equipment included therein.

Figure 2:
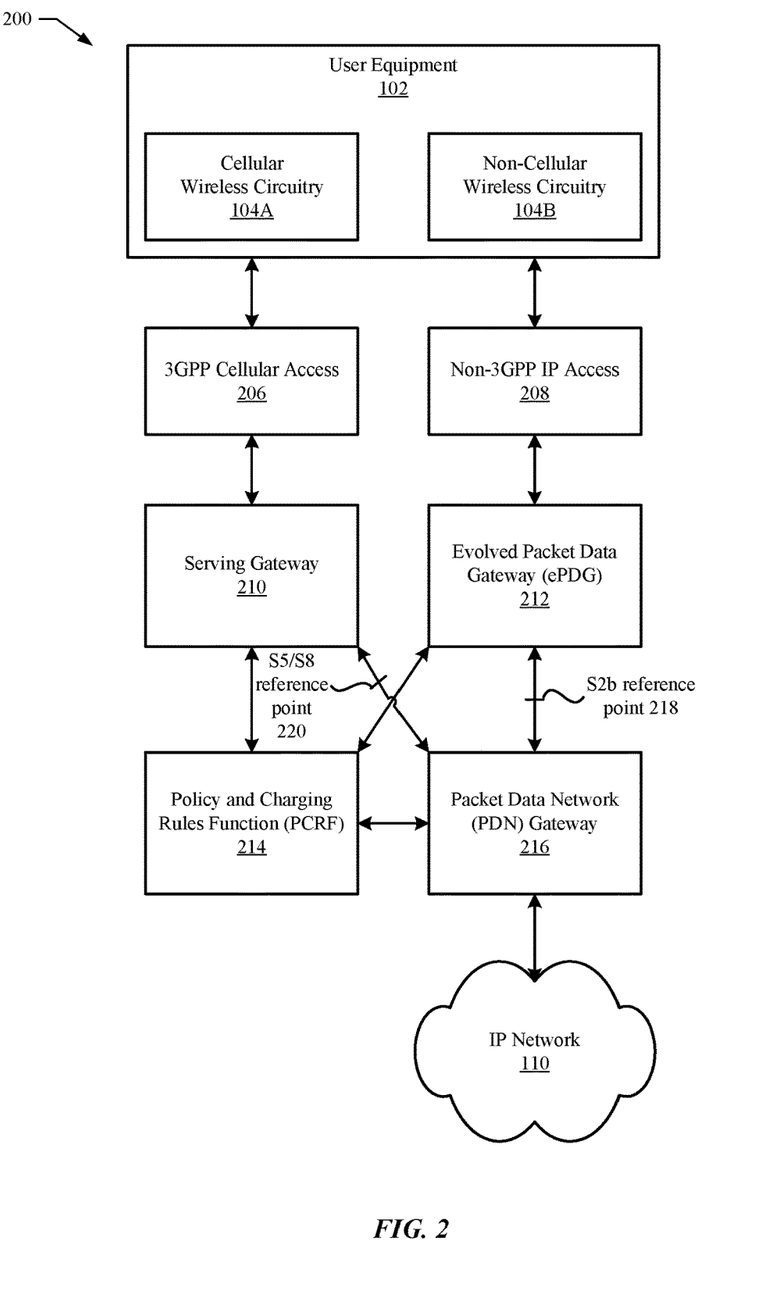
FIG. 2 illustrates exemplary components of wireless access networks and a core network, in accordance with some embodiments.

FIG. 2 illustrates an example wireless system 200 that includes the UE 102 communicatively coupled to the IP network 110 through a 3GPP cellular wireless access 206 and/or through a non-3GPP IP-based wireless access 208. In some embodiments, the 3GPP cellular wireless access 206 includes an evolved universal terrestrial access network (E-UTRAN) or other network elements of an LTE/LTE-A wireless network. In some embodiments, the non-3GPP IP-based wireless access 208 includes a wireless local area network (WLAN) or portions thereof, e.g., a wireless access point (AP), and thus the non-3GPP IP-based wireless access 208 can also be referred to as a WLAN access. In some embodiments, the WLAN access can also be referred to as a Wi-Fi access to correspond to a WLAN that operates in accordance with a Wi-Fi wireless communication protocol. The UE 102 can be configured to connect individually and/or simultaneously to a given packet data network (PDN) through the 3GPP cellular wireless access 206 and the non-3GPP IP-based wireless access 208. The 3GPP cellular wireless access 206 connects to a serving gateway (GW), which connects to a PDN gateway 216 through an S5 reference point 220 or an S8 reference point 220 for roaming users. The PDN gateway 216 provides a connection to the IP network 110 through which a variety of services can be accessed. The non-3GPP IP-based wireless access 208 connects to an evolved packet data gateway (ePDG) 212, which connects to the PDN gateway 216 through an S2b reference point 218. Each of the serving gateway 210, the ePDG 212, and the PDN gateway 216 are also connected to a policy and charging rules function (PCRF) 214.

The 3GPP S2b reference point 218 between the ePDG 212 and the PDN gateway 216 provides a mechanism to allow the UE 102, when attached via an untrusted non-3GPP IP access network (e.g., via non-3GPP IP access 208), to connect securely via a 3GPP evolved packet system (EPS) network to the IP network 110 and to access services via the secure connection. The UE 102 can establish a secure connection, e.g., an Encapsulating Security Payload (ESP) tunnel based on an IP Security (IPsec) protocol, using an IKEv2 protocol signaling exchange between the UE 102 and the ePDG 212, which in turn can establish a secure tunnel, e.g., a Proxy Mobile IPv6 (PMIP) or GTP tunnel, to the PDN gateway 216 when a session for the UE 102 is anchored.

Support for Emergency Services Access Via Untrusted WLAN

In some embodiments, for the non-3GPP IP access 208, e.g., such as a WLAN access, when establishing a new connection via the S2b reference point 218, the UE 102 can indicate that the new connection should be dedicated for emergency services, e.g., by providing an indication in a message sent to the ePDG 212 when establishing the new connection. The UE 102 and the ePDG 212 can be considered as IKEv2 peers that exchange information during the establishment of a secure tunnel, e.g., during an authorization and authentication procedure, as part of a configuration payload exchange and/or through one or more notify messages using one or more IKEv2 attributes. In some embodiments, the IKEv2 attributes used can be formatted in accordance with attribute formats as defined in the IETF RFC 5996 and/or IETF RFC 7296, e.g., as shown in one or more of Sections 1.4, 1.5, and 3.1v5 therein. IKEv2 attributes can be used for communication between the UE 102 and the ePDG 212 as described herein, and may be defined in one or more 3GPP specifications and/or may be registered for use with the Internet Assigned Numbers Authority (IANA).

In response to the UE 102 detecting a request to establish an emergency services connection, which may be sought to be established via an untrusted WLAN over the S2b reference point 218, e.g., where the request is based on an input received via a user interface of the UE 102, the UE 102 can de-register from an IMS server for any existing non-emergency services for which the UE 102 can be registered with the IMS server. The UE 102 can also release any existing PDN connections with an existing ePDG 212 used for non-emergency services before establishing a new PDN connection dedicated for emergency services with the same ePDG 212 or with another ePDG 212. The UE 102 can then establish the new PDN connection dedicated for emergency services with an ePDG 212 that supports emergency services via the untrusted WLAN. The UE 102 can register with an IMS server for emergency services for the new PDN connection. The ePDG 212 used for emergency services can be associated with a serving PLMN. The UE 102 can indicate that the new PDN connection is to be dedicated to emergency services by providing an indication as part of a connectivity request for emergency services sent to the ePDG 212. In some embodiments, the indication can be included as part of an IKEv2 message sent by the UE 102 to the ePDG 212. In some embodiments, the ePDG 212 can respond by including an indication of support for emergency services (and/or as an indication of support for the request for emergency services from the UE 102) in an IKEv2 message sent by the ePDG 212 to the UE 102.

IKEv2 Messages

Figure 3:
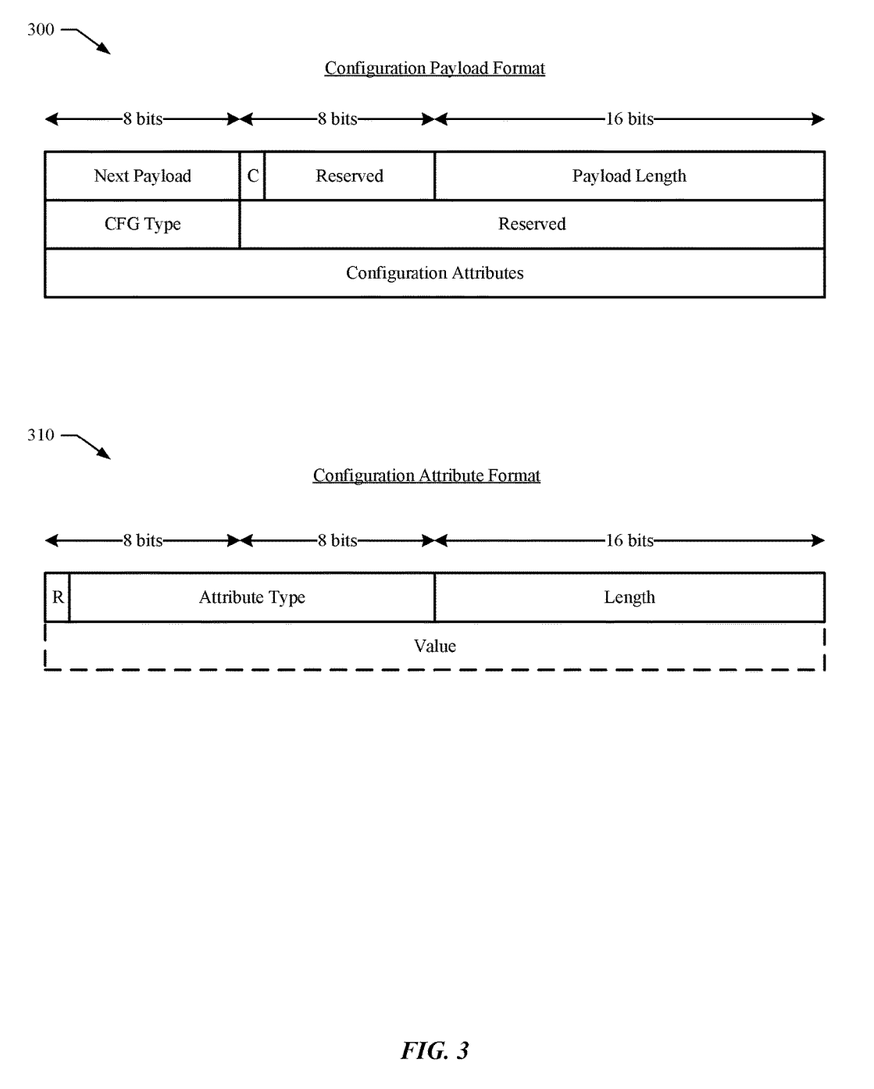
FIG. 3 illustrates a set of representative formats for messages that can be exchanged between a wireless communication device and a network element, in accordance with some embodiments.

IKEv2 messages can be exchanged between IKEv2 peers (e.g., the UE 102 and the ePDG 212) as part of one or more exchanges performed during and/or after establishment of a secure tunnel. The messages can be formatted in accordance with formats as defined in various sections of RFC 5996 and/or IETF RFC 7296. FIG. 3 illustrates a representative configuration payload format 300 that can be used to communicate information between IKEv2 peers, such as between the UE 102 and the ePDG 212, as part of one or more exchanges during and/or after establishment of a secure tunnel. In some embodiments, during establishment of the secure tunnel, the UE 102 can provide an indication that a PDN connection being established with the ePDG 212 should be dedicated for emergency services, e.g., as part of the configuration attribute field in the configuration payload format 300. In some embodiments, the configuration attribute field format 310 can be as shown in FIG. 3, using a type length value (TLV) structure. In some embodiments, the UE 102 includes a configuration attribute field format 310 having particular values included therein to indicate that the UE 102 seeks to establish a PDN connection (and/or a secure tunnel) to the ePDG 212 and that the PDN connection (secure tunnel) is to be dedicated for emergency services, such as an EMERGENCY_IND configuration attribute. In some embodiments, the EMERGENCY_IND configuration attribute can be formatted to include a zero value Reserve ('R') bit, followed by a 15-bit Attribute Type value that is reserved by the IANA and included in a table of IKEv2 parameters maintained by the IANA to indicate emergency services and thereby associated with a request for an emergency services connection. The Length field can include 16 bits set to a value of zero to indicate that the Value field is empty, i.e., the Attribute Type value reserved for EMERGENCY_IND can suffice to provide the indication to the ePDG 212 that the UE 102 seeks to establish a PDN connection dedicated to emergency services. In some embodiments, the UE 102 includes the EMERGENCY_IND configuration attribute in an IKEv2 CFG_REQUEST configuration payload of an IKE_AUTH request sent to the ePDG 212 to indicate establishment of an IPSec tunnel dedicated for emergency services. In some embodiments, the ePDG 212, in response to an IKEv2 CFG_REQUEST configuration payload that includes the EMERGENCY_IND configuration attribute and when the ePDG 212 supports an emergency services connection, includes the EMERGENCY_IND configuration attribute (or an equivalent indication) in an IKEv2 CFG_REPLY configuration payload sent in a response to the UE 102 to confirm establishment of the IPSec tunnel dedicated for emergency services.

In some embodiments, the UE 102 includes an Access Point Name (APN) in one or more signaling messages sent to the ePDG 212, and the ePDG 212 can ignore the APN provided by the UE 102. The ePDG 212 can consider the target APN for the UE 102 to be an APN configured within a set of Emergency Configuration Data at the ePDG 212. In some embodiments, the ePDG 212 does not check whether the target APN is part of a subscription for the UE 102, as the emergency services connection can be established without authentication or authorization for the UE 102. In some embodiments, the Emergency APN can be used by the ePDG 212 to derive a PDN gateway for the emergency services connection to be established. In some embodiments, the set of Emergency Configuration Data at the ePDG 212 can include a statically configured PDN gateway for the Emergency APN. The ePDG 212 can use the emergency indication provided by the EMERGENCY_IND configuration attribute from the UE 102 to give precedence to the requested emergency services connection, such as when congestion at the control plane (or other network congestion) occurs as reported via a GPRS Tunneling Protocol (GTP) for the control plane, e.g., via GTP-C or using a Diameter based protocol. The UE 102 can subsequently perform a Session Initiation Protocol (SIP) registration for emergency services via an IMS network and then issue a SIP emergency setup session via the IMS network.

EAP-AKA Messages

In some embodiments, when the UE 102 is able to authenticate with the wireless network via the untrusted WLAN, the UE 102 can indicate a request for an Emergency Services connection using one or more signaling messages as part of an Extensible Authentication Protocol (EAP) that is based on an Authentication and Key Agreement (AKA) mechanism specified by RFC 4187, which is incorporated by reference herein for all purposes, and used by one or more 3GPP wireless communication protocols. The UE 102 can indicate the Emergency Services connection request by including an EMERGENCY_IND message attribute in the EAP-Request/AKA-Identity signaling message sent to an AAA server, which can be connected to a home subscriber server (HSS) and can authenticate the UE 102. The AAA server can forward the indication of an emergency services connection request from the UE 102 to the ePDG 212 in order to configure the connection to be established as dedicated to emergency services with requisite priority. In some embodiments, the UE 102 sends EAP-AKA messages over IKEv2 to the ePDG 212, and the ePDG 212 extracts the EAP messages received from the UE 102 via IKEv2 and forwards them to the AAA server, e.g., via a Diameter interface. In some embodiments, the AAA server, in response to the EAP-Request/AKA-Identity signaling message that includes the EMERGENCY_IND message attribute and when supporting an emergency services connection, includes the EMERGENCY_IND message attribute (or an equivalent message attribute indication for support of emergency services) in an EAP-Success signaling message to confirm the established connection for emergency services.

Some solutions for emergency services via untrusted WLAN can be restricted to a UE 102 that has valid credentials to access the EPC via the WLAN and is authorized to connect to the EPC via the WLAN in a location where the UE 102 initiates the emergency services connection. In some embodiments, however, any UE 102 capable of communication via an untrusted WLAN can be configured to indicate a request to establish an emergency services connection via the untrusted WLAN, and the UE 102 can be provided an emergency services connection via the untrusted WLAN without requiring authentication and/or specific credentials from the UE 102 to establish the emergency services connection. In such embodiments, the use of IKEv2 messages, without requiring EAP-AKA messages, can be preferred. In some embodiments, the UE 102 can be located in a geographic area in which regular authenticated service can be unavailable or for which the UE 102 can be restricted to not be provided with regular authenticated service but can be configured and allowed to establish an emergency services connection via an untrusted WLAN, without requiring authentication for the UE 102. In some embodiments, a UE 102 that is not authenticated can be provided an emergency services connection via an untrusted WLAN. In some embodiments, the UE 102 can include no Universal Subscriber Identity Module (USIM) and/or no Universal Integrated Circuit Card (UICC) and can be still capable of requesting and establishing an emergency services connection via an untrusted WLAN. In some embodiments, the UE 102 can include no active or usable SIM, USIM, eSIM, or equivalent and can be able to request and establish an emergency services connection via an untrusted WLAN.

ePDG Selection for Emergency Services

In some embodiments, the UE 102 can be configured with an IP address and/or an FQDN of an ePDG 212 in an HPLMN (and/or a VPLMN), where the ePDG 212 indicated by the IP address and/or by the FQDN can support emergency services. In some embodiments, the UE 102 can store (and/or access from an associated storage) a set of static IP addresses and/or FQDN values for ePDGs 212 that can support emergency services. The use of a static configuration of ePDG 212 IP addresses and/or FQDN values for an HMPLN can be relatively straightforward; however, for roaming scenarios, where the UE 102 can roam to any of a large number of possible VPLMNs, the use of a static configuration can be more cumbersome.

In some embodiments, the UE 102 can use a domain name system (DNS) server based ePDG/PGW discovery mechanism, such as a DNS server look up of a fully qualified domain name (FQDN) to determine an ePDG 212 that can provide emergency services for the UE 102. The UE 102 can follow a procedure as described in 3GPP TS 23.402 Section 4.5.4, which is incorporated by reference herein in its entirety for all purposes, to form an FQDN for an ePDG 212 using a mobile network code (MNC) and a mobile country code (MCC) of the PLMN (whether an HPLMN or a VPLMN) as described in TS 23.003 Section 19.4.2.9, which also is incorporated by reference herein in its entirety for all purposes. The procedures described in TS 23.402 and/or 23.003 can be supplemented with the following additions. In some embodiments, the UE 102 can add an indication of an emergency services connection capability to the FQDN, e.g., by appending an "sos" label indication (or another equivalent emergency services label indication) to the FQDN for the ePDG 212. For example, the augmented FQDN can be formatted as:

sos.epdg.epc.mnc<MNC>.mcc<MCC>.pub.3gppnetwork.org where <MNC> and <MCC> correspond to values for the MNC and MCC respectively in which the UE 102 operates. When a particular ePDG 212 supports both regular services and emergency services, a DNS server translation of the augmented FQDN and of an un-augmented FQDN (without the additional sos label indication or other equivalent emergency services label indication) can result in the same IP address (or set of IP addresses, in some embodiments).

In some embodiments, the UE 102 sends an FQDN, without augmentation, to a DNS server, which returns an ePDG 212 indication to the UE 102. The UE 102 sends a connection establishment request, which includes an indication of an emergency services connection, e.g., the IKEv2 message as described herein, to the ePDG 212 indicated to the UE 102 by the DNS server, and when the ePDG 212 does not support emergency services, the ePDG 212 redirects the UE 102 to another ePDG 212 that supports emergency services. In some embodiments, the ePDG 212 uses one or more procedures for redirection as defined in IETF RFC 5685, which is incorporated by reference herein in its entirety for all purposes.

Figure 4:
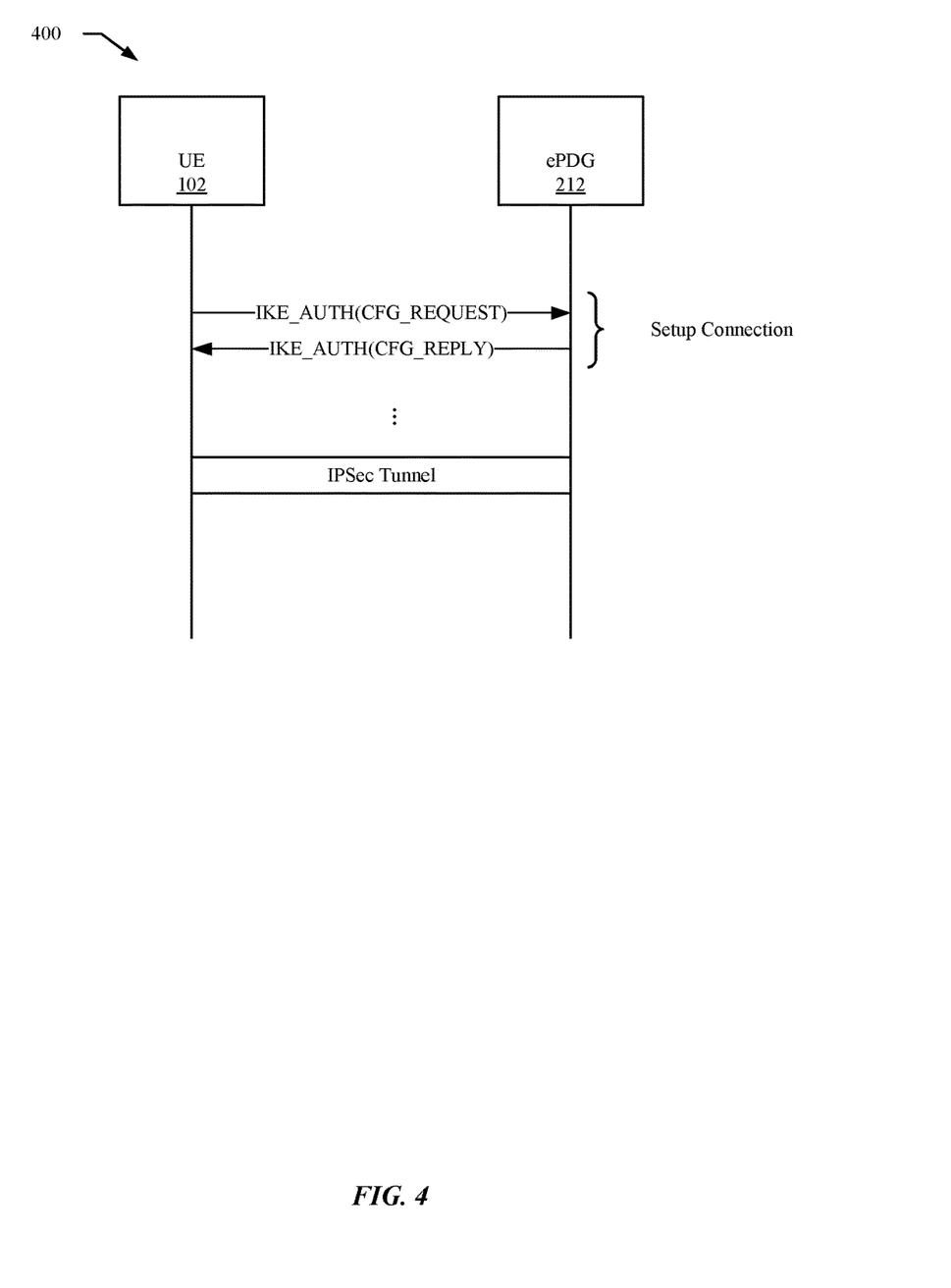
FIG. 4 illustrates an exemplary message exchange as part of establishing a secure tunnel for emergency services between a wireless communication device and a network element via an untrusted WLAN, in accordance with some embodiments.

FIG. 4 illustrates a flow chart 400 of a portion of an exemplary signaling message exchange between the UE 102 and the ePDG 212 to establish a secure connection, e.g., an IPSec tunnel, between the UE 102 and the ePDG 212, via an untrusted WLAN, where the secure connection is dedicated to emergency services. The UE 102 can send to the ePDG 212 an IKE_AUTH signaling message that includes a CFG_REQUEST configuration payload, e.g., formatted as shown in FIG. 3, that includes a configuration attribute that indicates a request to establish an emergency services connection. The configuration attribute can be formatted as shown in FIG. 3 and can include values specified for indication of an emergency services connection as described hereinabove. The ePDG 212 can respond to the IKE_AUTH signaling message from the UE 102 by sending to the UE 102 an IKE_AUTH signaling message that includes a CFG_REPLY configuration payload that includes a configuration attribute that indicates acceptance of the request to establish the emergency services connection. In some embodiments, the configuration attribute included in the CFG_REQUEST and in the CFG_REPLY can be formatted with the same values. In some embodiments, the CFG_REPLY includes one or more accepted configuration attributes returned to the UE 102 from the ePDG 212 to specify properties for the emergency services connection being established between the UE 102 and the ePDG 212. In some embodiments, the UE 102 uses a static configuration, e.g., a stored table of values, to determine the ePDG 212 to which to send the IKE_AUTH(CFG_REQUEST) signaling message. In some embodiments, the UE 102 uses a dynamic configuration, e.g., by querying a DNS server with an FQDN, to determine the ePDG 212 to which to send the IKE_AUTH(CFG_REQUEST) signaling message. In some embodiments, the UE 102 sends the IKE_AUTH(CFG_REQUEST) signaling message to the ePDG 212 without knowledge of whether the ePDG 212 can support the request for an emergency services connection and when the ePDG 212 supports emergency services the ePDG 212 responds with the IKE_AUTH(CFG_REPLY) signaling message that includes an indication of support for emergency services. In some embodiments, when the ePDG 212 does not support the request for an emergency services connection, the ePDG 212 redirects the UE 102 to another ePDG 212 that supports establishing an emergency services connection.

Figure 5:
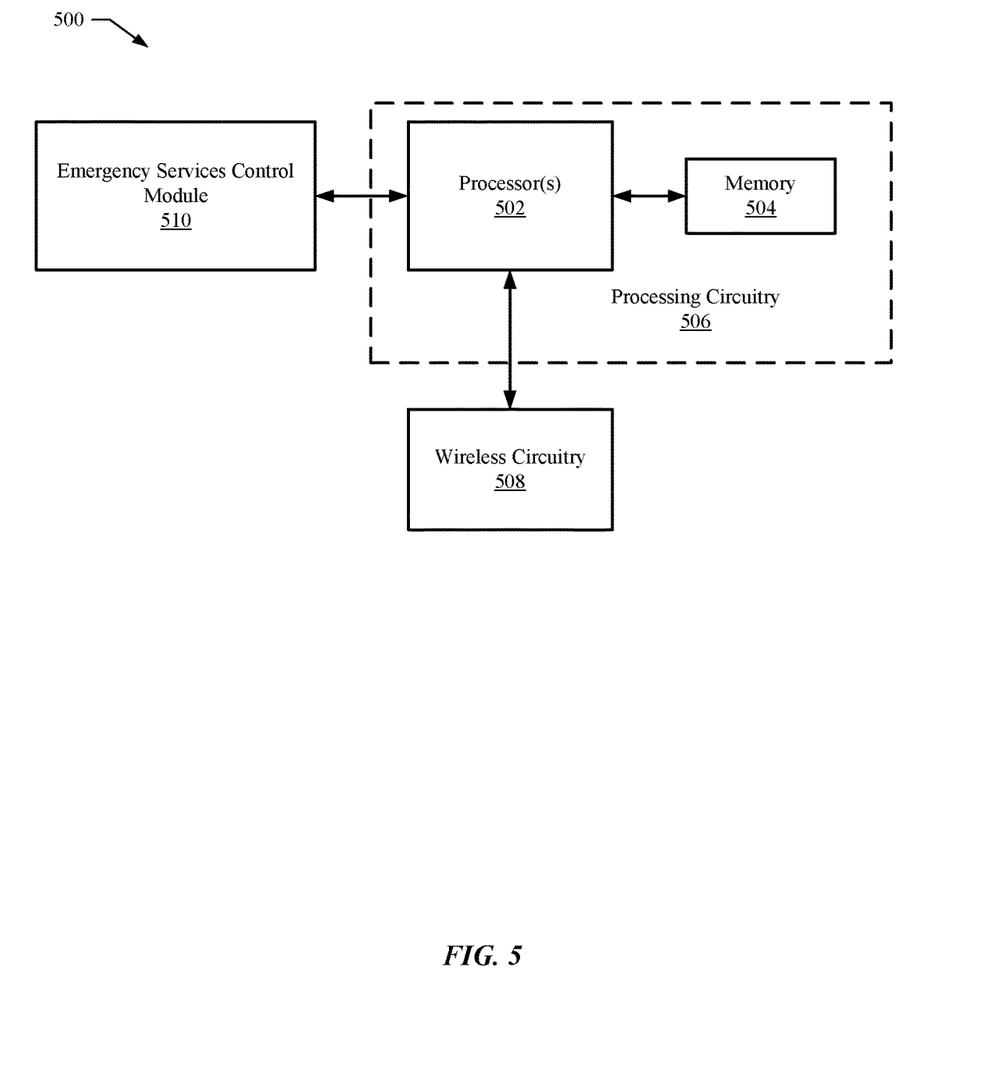
FIG. 5 illustrates a block diagram of an exemplary apparatus that can be implemented on a wireless communication device to support establishment of emergency services via an untrusted WLAN, in accordance with some embodiments.

FIG. 5 illustrates a diagram 500 of components of an exemplary wireless communication device, such as UE 102, including one or more processor(s) 502 coupled to memory 504, which together can be referred to as processing circuitry 506, wireless circuitry 508 that provides for wireless radio frequency (RF) connections between the UE 102 and various wireless networks, e.g., the 3GPP cellular wireless access 206 using the cellular wireless circuitry 104A and/or the non-3GPP IP-based wireless access 208 using the non-cellular wireless circuitry 104B. The UE 102 can also include an emergency services control module 510 configurable to operate together with the processing circuitry 506 and the wireless circuitry 508 to perform one or more operations for the UE 102 as described herein to control access to emergency services for the UE 102, which can include access to emergency services via an untrusted WLAN. In some embodiments, the wireless circuitry 508 includes one or more baseband processor(s), and a set of RF analog front-end circuitry. In some embodiments, the wireless circuitry 508 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 508 can include components of RF analog front-end circuitry, e.g. a set of one or more antennas, which can be interconnected with additional supporting RF circuitry that can include filters and other analog components that can be configured for transmission and/or reception of analog signals via one or more corresponding antennas to one or more wireless networks.

The processor(s) 502 and the wireless circuitry 508 can be configured to perform and/or control performance of one or more functionalities of the UE 102, in accordance with various implementations. The processor(s) 502 and the wireless circuitry 508 can provide functionality for access to emergency services for the UE 102, including through an untrusted WLAN. The processor(s) 502 may include multiple processors of different types that can provide for both wireless communication management and/or higher layer functions, e.g., one or more of the processor(s) 502 may be configured to perform data processing, application execution, and/or other device functions according to one or more embodiments of the disclosure. The UE 102, or portions or components thereof, such as processor(s) 502, can include one or more chipsets, which can respectively include any number of coupled microchips thereon.

In some embodiments, the processor(s) 502 may be configured in a variety of different forms. For example, the processor(s) 502 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 502 of the UE 102 can be coupled to and/or configured in operative communication with each other, and these components may be collectively configured to perform IP flow mobility management functions via multiple wireless networks. In some implementations, the processor(s) 502 can be configured to execute instructions that may be stored in memory 504, or that can otherwise be accessible to the processor(s) 502 in some other device memory. As such, whether configured as, or in conjunction with, hardware or a combination of hardware and software, the processor(s) 502 may be capable of performing operations according to various implementations described herein, when configured accordingly. In various embodiments, memory 504 in the UE 102 may include multiple memory devices that can be associated with any common volatile or non-volatile memory type. In some scenarios, the memory 504 may be associated with a non-transitory computer-readable storage medium that can store various computer program instructions, which may be executed by the processor(s) 502 during normal program executions. In this regard, the memory 504 can be configured to store information, data, applications, instructions, or the like, for enabling the UE 102 to carry out various functions in accordance with one or more embodiments of the disclosure. In some implementations, the memory 504 may be in communication with, and/or otherwise coupled to, the processor(s) 502, as well as one or more system buses for passing information between and amongst the different device components of the UE 102.

It should be appreciated that not all of the components, device elements, and hardware illustrated in and described with respect to the UE 102 shown in FIG. 5 may be essential to this disclosure, and thus, some of these items may be omitted, consolidated, or otherwise modified within reason. Additionally, in some implementations, the subject matter associated with the UE 102 can be configured to include additional or substitute components, device elements, or hardware, beyond those depicted within the illustration of FIG. 5.

Figure 6:
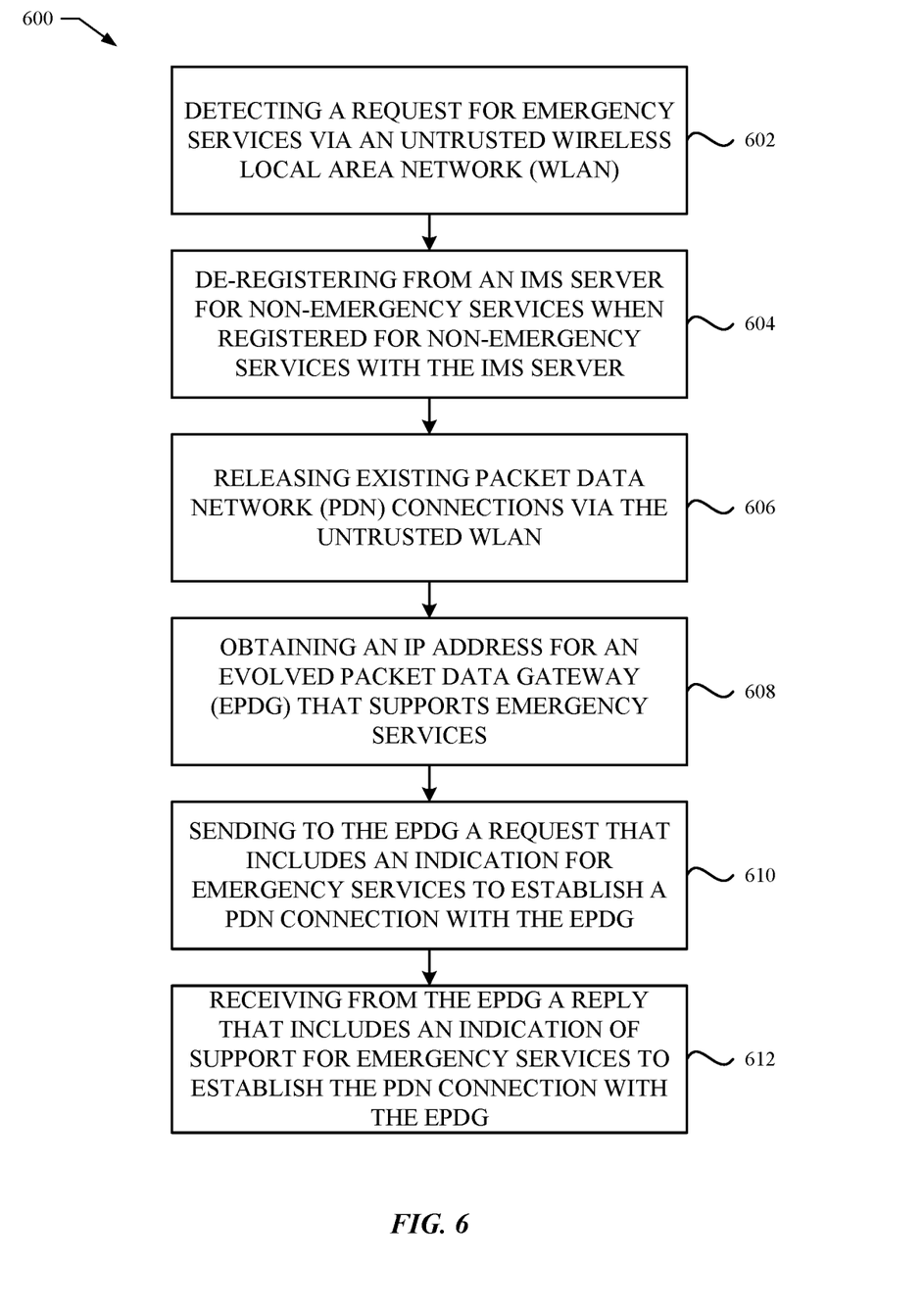
FIG. 6 illustrates an exemplary method to establish a connection for emergency services for a wireless communication device via an untrusted WLAN, in accordance with some embodiments.

FIG. 6 illustrates a flowchart 600 of a representative method to control access to emergency services via an untrusted WLAN for a wireless communication device, such as the UE 102, implemented at the wireless communication device, at least in part. At 602, the wireless communication device detects a request for emergency services, such as based on an input via a user interface of the wireless communication device, for a connection to be established via an untrusted WLAN. In some embodiments, the request for emergency services is non-specific as to the access network to be used to establish a connection for emergency services, and the wireless communication device determines that the request can be serviced via an untrusted WLAN, e.g., when a cellular service is unavailable to the wireless communication device and/or when the wireless communication device not authorized to establish a connection via a cellular service in the location at which the wireless communication device is operating. At 604, in response to detecting the request for emergency services, when the wireless communication device is registered for non-emergency services with an IMS server via an untrusted WLAN, the wireless communication device de-registers from the IMS server for the non-emergency services. At 606, the wireless communication device releases existing PDN connections between the wireless communication device and associated ePDGs via the untrusted WLAN. In some embodiments, when the wireless communication device is not registered for non-emergency services and/or when there are no existing PDN connections via an untrusted WLAN, the de-registration with the IMS server and the release of PDN connections by the wireless communication device as described for 604 and 606 can be skipped. At 608, the wireless communication device obtains an IP address for an ePDG that supports emergency services. In some embodiments, the wireless communication device retrieves the IP address from a stored (and/or otherwise accessible) table that lists IP addresses for ePDGs that support emergency services, such as for an HPLMN or a VPLMN with which the wireless communication device is associated. In some embodiments, the wireless communication device queries a DNS server to obtain an IP address for an ePDG that supports emergency services via an untrusted WLAN. In some embodiments, the wireless communication device provides an FQDN to the DNS server to obtain the IP address of the ePDG. In some embodiments, the FQDN includes a label that indicates that emergency services should be supported by the ePDG for which the IP address is returned by the DNS server. At 610, the wireless communication device sends to the ePDG a request that includes an indication for emergency services to establish a PDN connection with the ePDG via an untrusted WLAN. In some embodiments, the request is part of an IKEv2 signaling message. In some embodiments, the indication for emergency services is included as part of a configuration attribute, e.g., as part of a set of requested and/or supported configuration attributes provided by the wireless communication device to the ePDG. At 612, the wireless communication device receives from the ePDG a reply that includes an indication of support for emergency services to establish the PDN connection with the ePDG. In some embodiments, the reply is part of an IKEv2 signaling message. In some embodiments, the indication for emergency services support returned by the ePDG is a configuration attribute, e.g., as part of a set of accepted configuration attributes returned by the ePDG to the wireless communication device for the connection being established.

Representative Embodiments

In an embodiment, a method performed by a wireless communication device to request an emergency services connection via an untrusted wireless local area network (WLAN) includes: detecting a request for emergency services via the untrusted WLAN; de-registering from an Internet Protocol Multimedia Subsystem (IMS) server for non-emergency services when the wireless communication device is registered for non-emergency services with the IMS server; releasing existing packet data network (PDN) connections via the untrusted WLAN; obtaining an Internet Protocol (IP) address for an evolved packet data gateway (ePDG) that supports emergency services; sending to the ePDG a request that includes an indication for emergency services to establish a PDN connection with the ePDG; and receiving from the ePDG a reply that includes an indication of support for emergency services to establish the PDN connection with the ePDG.

In some embodiments, the request for emergency services is non-specific as to a wireless access network via which to establish the PDN connection, and the method further includes the wireless communication device determining that a cellular service is not available for the wireless communication device to establish the PDN connection for emergency services. In some embodiments, the wireless communication device is not authorized to establish a connection via a cellular service in a location at which the wireless communication device is operating. In some embodiments, the wireless communication device obtains the IP address for the ePDG from a stored table that lists IP addresses for ePDGs that support emergency services. In some embodiments, the wireless communication device obtains the IP address for the ePDG by at least: providing a fully qualified domain name (FQDN) to a domain name system (DNS) server; and receiving the IP address for the ePDG from the DNS server. In some embodiments, the FQDN includes a label that indicates that the ePDG should support emergency services. In some embodiments, the label includes an emergency services label as part of the FQDN to indicate that the ePDG should support emergency services. In some embodiments, the request that includes the indication for emergency services includes a first IKEv2 signaling message including a configuration attribute that includes the indication for emergency services. In some embodiments, the reply that includes the indication of support for emergency services includes a second IKEv2 signaling message that includes the configuration attribute provided by the wireless communication device as part of a set of accepted configuration attributes returned by the ePDG to the wireless communication device.

In an embodiment, an apparatus configurable for operation in a wireless communication device includes: memory storing instructions; and processing circuitry including one or more processors that, when executing the instructions, cause the wireless communication device to: detect a request to establish an emergency services connection via an untrusted wireless local area network (WLAN); de-register from an Internet Protocol Multimedia Subsystem (IMS) server for non-emergency services when the wireless communication device is registered for non-emergency services with the IMS server; release existing packet data network (PDN) connections via the untrusted WLAN; obtain an Internet Protocol (IP) address for an evolved packet data gateway (ePDG) that supports emergency services; send to the ePDG a request that includes an indication for emergency services to establish a PDN connection with the ePDG; and receive from the ePDG a reply that includes an indication of support for emergency services to establish the PDN connection with the ePDG.

In some embodiments, receive from the ePDG a reply that includes an indication of support for emergency services to establish the PDN connection with the ePDG. In some embodiments, the wireless communication device obtains the IP address for the ePDG by at least: providing a fully qualified domain name (FQDN) to a domain name system (DNS) server; and receiving the IP address for the ePDG from the DNS server. In some embodiments, the FQDN includes an emergency services label as part of the FQDN to indicate that the ePDG should support emergency services. In some embodiments, the request that includes the indication for emergency services includes a first IKEv2 signaling message including a configuration attribute that includes the indication for emergency services; and the reply that includes the indication of support for emergency services includes a second IKEv2 signaling message that includes the configuration attribute provided by the wireless communication device as part of a set of accepted configuration attributes returned by the ePDG to the wireless communication device.

In an embodiment, a wireless communication device configurable to request an emergency services connection via an untrusted wireless local area network (WLAN) includes: wireless circuitry communicatively coupled to one or more antennas; one or more processors communicatively coupled to the wireless circuitry; and a memory communicatively coupled to the one or more processors storing instructions that, when executed by the one or more processors, cause the wireless communication device to: detect a request to establish the emergency services connection via the untrusted WLAN; de-register from an Internet Protocol Multimedia Subsystem (IMS) server for non-emergency services when the wireless communication device is registered for non-emergency services with the IMS server; release existing packet data network (PDN) connections via the untrusted WLAN; obtain an Internet Protocol (IP) address for an evolved packet data gateway (ePDG) that supports emergency services; send to the ePDG a request that includes an indication for emergency services to establish a PDN connection with the ePDG; and receive from the ePDG a reply that includes an indication of support for emergency services to establish the PDN connection with the ePDG.

In some embodiments, the wireless communication device is not authorized to establish a connection via a cellular service in a location at which the wireless communication device is operating. In some embodiments, the wireless communication device obtains the IP address for the ePDG from a stored table that lists IP addresses for ePDGs that support emergency services. In some embodiments, the wireless communication device obtains the IP address for the ePDG by at least: providing a fully qualified domain name (FQDN) to a domain name system (DNS) server; and receiving the IP address for the ePDG from the DNS server. In some embodiments, the FQDN includes an emergency services label as part of the FQDN to indicate that the ePDG should support emergency services. In some embodiments, the request that includes the indication for emergency services includes a first IKEv2 signaling message including a configuration attribute that includes the indication for emergency services; and the reply that includes the indication of support for emergency services includes a second IKEv2 signaling message that includes the configuration attribute provided by the wireless communication device as part of a set of accepted configuration attributes returned by the ePDG to the wireless communication device.

In an embodiment, an apparatus to request an emergency services connection via an untrusted wireless local area network (WLAN) for a wireless communication device includes: means for detecting a request for emergency services via the untrusted WLAN; de-registering from an Internet Protocol Multimedia Subsystem (IMS) server for non-emergency services when the wireless communication device is registered for non-emergency services with the IMS server; means for releasing existing packet data network (PDN) connections via the untrusted WLAN; obtaining an Internet Protocol (IP) address for an evolved packet data gateway (ePDG) that supports emergency services; means for sending to the ePDG a request that includes an indication for emergency services to establish a PDN connection with the ePDG; and means for receiving from the ePDG a reply that includes an indication of support for emergency services to establish the PDN connection with the ePDG.

In some embodiments, the request for emergency services is non-specific as to a wireless access network via which to establish the PDN connection, and the apparatus further includes means for determining that a cellular service is not available for the wireless communication device to establish the PDN connection for emergency services. In some embodiments, the wireless communication device is not authorized to establish a connection via a cellular service in a location at which the wireless communication device is operating. In some embodiments, the wireless communication device obtains the IP address for the ePDG from a stored table that lists IP addresses for ePDGs that support emergency services. In some embodiments, the means for obtaining the IP address for the ePDG that supports emergency services includes: means for providing a fully qualified domain name (FQDN) to a domain name system (DNS) server; and means for receiving the IP address for the ePDG from the DNS server. In some embodiments, the FQDN includes a label that indicates that the ePDG should support emergency services. In some embodiments, the label includes an emergency services label as part of the FQDN to indicate that the ePDG should support emergency services. In some embodiments, the request that includes the indication for emergency services includes a first IKEv2 signaling message including a configuration attribute that includes the indication for emergency services. In some embodiments, the reply that includes the indication of support for emergency services includes a second IKEv2 signaling message that includes the configuration attribute provided by the wireless communication device as part of a set of accepted configuration attributes returned by the ePDG to the wireless communication device.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method to request an emergency services connection via an untrusted wireless local area network (WLAN) for a wireless communication device, the method comprising:
by the wireless communication device:
detecting a request for emergency services via the untrusted WLAN;
de-registering from an Internet Protocol Multimedia Subsystem (IMS) server for non-emergency services when the wireless communication device is registered for non-emergency services with the IMS server;
releasing existing packet data network (PDN) connections via the untrusted WLAN;
obtaining an Internet Protocol (IP) address for a first evolved packet data gateway (ePDG);
sending to the first ePDG an IKEv2 CFG_REQUEST message that includes in its configuration payload an indication for emergency services to establish a PDN connection with the first ePDG;
when the first ePDG supports emergency services:
receiving from the first ePDG an IKEv2 CFG_REPLY message that includes in its configuration payload an indication of support for emergency services to establish the PDN connection with the first ePDG; and
establishing the PDN connection with the first ePDG without authentication of the wireless communication device; and
when the first ePDG does not support emergency services:
receiving from the first ePDG a message that includes a second IP address for a second ePDG that supports emergency services;
sending to the second ePDG the IKEv2 CFG_REQUEST message that includes in its configuration payload the indication for emergency services to establish the PDN connection with the second ePDG;
receiving from the second ePDG the IKEv2 CFG_REPLY message that includes in its configuration payload the indication of support for emergency services to establish the PDN connection with the second ePDG; and
establishing the PDN connection with the second ePDG without authentication of the wireless communication device.

2. The method of claim 1, wherein the request for emergency services is non-specific as to a wireless access network via which to establish the PDN connection, and the method further comprises:

by the wireless communication device:
    determining that a cellular service is not available for the wireless communication device to establish the PDN connection for emergency services.

3. The method of claim 1, wherein the wireless communication device is not authorized to establish a connection via a cellular service in a location at which the wireless communication device is operating.

4. The method of claim 1, wherein the wireless communication device obtains the IP address for the first ePDG from a stored table that lists IP addresses for ePDGs.

5. The method of claim 1, wherein the wireless communication device obtains the IP address for the first ePDG by at least:
    providing a fully qualified domain name (FQDN) to a domain name system (DNS) server; and
    receiving the IP address for the first ePDG from the DNS server.

6. The method of claim 5, wherein the FQDN does not include a label that indicates that the first ePDG should support emergency services.

7. The method of claim 1, wherein the IKEv2 CFG_REQUEST message includes a specific configuration attribute assigned for emergency services in its configuration payload.

8. The method of claim 7, wherein the IKEv2 CFG_REPLY message includes the specific configuration attribute provided by the wireless communication device as part of a set of accepted configuration attributes returned by the first ePDG to the wireless communication device.

9. An apparatus configurable for operation in a wireless communication device, the apparatus comprising:
    memory storing instructions; and
    processing circuitry comprising one or more processors that, when executing the instructions, cause the wireless communication device to:
        detect a request to establish an emergency services connection via an untrusted wireless local area network (WLAN);
        de-register from an Internet Protocol Multimedia Subsystem (IMS) server for non-emergency services when the wireless communication device is registered for non-emergency services with the IMS server;
        release existing packet data network (PDN) connections via the untrusted WLAN;
        obtain an Internet Protocol (IP) address for a first evolved packet data gateway (ePDG);
        send to the first ePDG an IKEv2 CFG_REQUEST message that includes in its configuration payload an indication for emergency services to establish a PDN connection with the first ePDG;
        when the first ePDG supports emergency services:
            receive from the first ePDG an IKEv2 CFG_REPLY message that includes in its configuration payload an indication of support for emergency services to establish the PDN connection with the first ePDG; and
            establish the PDN connection with the first ePDG without authentication of the wireless communication device; and
        when the first ePDG does not support emergency services:
            receive from the first ePDG a message that includes a second IP address for a second ePDG that supports emergency services;
            send to the second ePDG the IKEv2 CFG_REQUEST message that includes in its configuration payload the indication for emergency services to establish the PDN connection with the second ePDG;
            receive from the second ePDG the IKEv2 CFG_REPLY message that includes in its configuration payload the indication of support for emergency services to establish the PDN connection with the second ePDG; and
            establish the PDN connection with the second ePDG without authentication of the wireless communication device.

10. The apparatus of claim 9, wherein the wireless communication device obtains the IP address for the first ePDG from a stored table that lists IP addresses for ePDGs.

11. The apparatus of claim 9, wherein the wireless communication device obtains the IP address for the first ePDG by at least:
    providing a fully qualified domain name (FQDN) to a domain name system (DNS) server; and
    receiving the IP address for the first ePDG from the DNS server.

12. The apparatus of claim 11, wherein the FQDN does not include an emergency services label as part of the FQDN to indicate that the first ePDG should support emergency services.

13. The apparatus of claim 9, wherein:
    the IKEv2 CFG_REQUEST message includes a specific configuration attribute assigned for emergency services in its configuration payload; and
    the IKEv2 CFG_REPLY message includes the specific configuration attribute provided by the wireless communication device as part of a set of accepted configuration attributes returned by the first ePDG to the wireless communication device.

14. A wireless communication device configurable to request an emergency services connection via an untrusted wireless local area network (WLAN), the wireless communication device comprising:
    wireless circuitry communicatively coupled to one or more antennas;
    one or more processors communicatively coupled to the wireless circuitry; and
    a memory communicatively coupled to the one or more processors storing instructions that, when executed by the one or more processors, cause the wireless communication device to:
        detect a request to establish the emergency services connection via the untrusted WLAN;
        de-register from an Internet Protocol Multimedia Subsystem (IMS) server for non-emergency services when the wireless communication device is registered for non-emergency services with the IMS server;
        release existing packet data network (PDN) connections via the untrusted WLAN;
        obtain an Internet Protocol (IP) address for a first evolved packet data gateway (ePDG);
        send to the first ePDG an IKEv2 CFG_REQUEST message that includes in its configuration payload an indication for emergency services to establish a PDN connection with the first ePDG;
        when the first ePDG supports emergency services:
            receive from the first ePDG an IKEv2 CFG_REPLY message that includes in its configuration payload an indication of support for emergency services to establish the PDN connection with the first ePDG; and establish the PDN connection with the first ePDG without authentication of the wireless communication device; and when the first ePDG does not support emergency services:

receive from the first ePDG a message that includes a second IP address for a second ePDG that supports emergency services;

send to the second ePDG the IKEv2 CFG_REQUEST message that includes in its configuration payload the indication for emergency services to establish the PDN connection with the second ePDG;

receive from the second ePDG the IKEv2 CFG_REPLY message that includes in its configuration payload the indication of support for emergency services to establish the PDN connection with the second ePDG; and establish the PDN connection with the second ePDG without authentication of the wireless communication device.

15. The wireless communication device of claim 14, wherein the wireless communication device is not authorized to establish a connection via a cellular service in a location at which the wireless communication device is operating.

16. The wireless communication device of claim 14, wherein the wireless communication device obtains the IP address for the first ePDG from a stored table that lists IP addresses for ePDGs.

17. The wireless communication device of claim 14, the wireless communication device obtains the IP address for the first ePDG by at least:

providing a fully qualified domain name (FQDN) to a domain name system (DNS) server; and receiving the IP address for the first ePDG from the DNS server.

18. The wireless communication device of claim 17, wherein the FQDN does not include an emergency services label as part of the FQDN to indicate that the first ePDG should support emergency services.

19. The wireless communication device of claim 14, wherein:

the IKEv2 CFG_REQUEST message includes a specific configuration attribute assigned for emergency services in its configuration payload; and the IKEv2 CFG_REPLY message includes the specific configuration attribute provided by the wireless communication device as part of a set of accepted configuration attributes returned by the first ePDG to the wireless communication device.

* * * * *